United States Patent
Johnson et al.

(10) Patent No.: US 7,619,018 B2
(45) Date of Patent: Nov. 17, 2009

(54) PROCESS FOR REMOVING FLUOROSURFACTANT FROM AQUEOUS FLUOROPOLYMER DISPERSIONS AND REDUCING SCUM FORMATION

(75) Inventors: David William Johnson, Washington, WV (US); Robert John Cavanaugh, Hilton Head Island, SC (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 611 days.

(21) Appl. No.: 11/292,455

(22) Filed: Dec. 2, 2005

(65) Prior Publication Data

US 2006/0135680 A1    Jun. 22, 2006

Related U.S. Application Data

(60) Provisional application No. 60/638,296, filed on Dec. 22, 2004.

(51) Int. Cl.
*C08L 1/00* (2006.01)
(52) U.S. Cl. .................. 523/310; 524/544; 524/700; 524/805; 526/249; 526/250
(58) Field of Classification Search .................. 523/310; 524/544, 700, 805; 526/249, 250
See application file for complete search history.

(56) References Cited

U.S. PATENT DOCUMENTS

| 2,559,752 | A | | 7/1951 | Berry |
| 3,704,227 | A | * | 11/1972 | Hill ............................ 510/117 |
| 3,704,272 | A | | 11/1972 | Holmes |
| 3,882,153 | A | | 5/1975 | Seki et al. |
| 4,282,162 | A | | 8/1981 | Kuhls |
| 5,055,286 | A | * | 10/1991 | Watanabe et al. ............ 423/584 |
| 6,153,688 | A | | 11/2000 | Miura et al. |
| 6,365,684 | B1 | * | 4/2002 | McCarthy et al. ............. 526/81 |
| 6,693,164 | B2 | * | 2/2004 | Blong et al. .................. 528/480 |
| 6,706,193 | B1 | * | 3/2004 | Burkard et al. ............. 210/662 |
| 6,720,437 | B2 | * | 4/2004 | Jones et al. .................. 554/191 |
| 6,825,250 | B2 | | 11/2004 | Epsch et al. |
| 6,833,403 | B1 | * | 12/2004 | Bladel et al. ................. 524/458 |
| 6,861,466 | B2 | | 3/2005 | Dadalas et al. |
| 2004/0132927 | A1 | | 7/2004 | Blong et al. |
| 2004/0143052 | A1 | | 7/2004 | Epsch et al. |
| 2004/0186219 | A1 | | 9/2004 | Dadalas et al. |

FOREIGN PATENT DOCUMENTS

| EP | 1 155 055 B1 | | 4/2003 |
| EP | 1 335 007 A1 | | 8/2003 |
| EP | 1335007 A1 | * | 8/2003 |
| EP | 1364972 A1 | * | 11/2003 |
| WO | WO-03/051988 A2 | * | 6/2003 |
| WO | WO 03/059992 A1 | | 7/2003 |
| WO | WO-2006/069109 A1 | * | 6/2006 |

* cited by examiner

*Primary Examiner*—Peter D. Mulcahy
*Assistant Examiner*—Henry Hu

(57) ABSTRACT

A process for reducing fluorosurfactant content of a stabilized fluorosurfactant-containing aqueous fluoropolymer dispersion containing ferric ions by contacting the fluoropolymer dispersion with strong base anion exchange resin to reduce fluorosurfactant content to a predetermined level, the anion exchange resin being in the hydroxide form, separating the dispersion from the anion exchange resin, and adding an effective amount of chelating agent having an equilibrium constant when complexed with iron of at least $10^{18}$ prior to the contacting with the ion exchange resin for complexing ferric ions to prevent scum formation.

8 Claims, No Drawings

PROCESS FOR REMOVING FLUOROSURFACTANT FROM AQUEOUS FLUOROPOLYMER DISPERSIONS AND REDUCING SCUM FORMATION

FIELD OF THE INVENTION

This invention relates to a process for removing fluorosurfactant from aqueous fluoropolymer dispersions using anion exchange resin.

BACKGROUND OF THE INVENTION

In forming aqueous fluoropolymer dispersion, it has long been recognized that small amounts of iron (ferric ions) in the dispersion can lead to a contamination problem called "red scum". Red scum is the term applied to dispersion which contains a layer of insoluble ferric hydroxide floating on the surface of the dispersion. Iron can get into the dispersion by addition of iron compounds in fluoropolymer recipes or from the metal equipment used in polymerization or processing polymer. In the as-polymerized acidic state, the iron present is soluble. However, in order to prevent bacterial growth, dispersion is usually made basic by the addition of compounds such as ammonium hydroxide or sodium hydroxide. When the dispersion is made basic, the iron becomes insoluble. Eventually the iron particles will float to the surface of the dispersion and appear as a yellow or red oil floating on the surface. This can take several days or weeks. As little as 0.2 ppm of iron can cause visible red scum in dispersion and such scum is an aesthetic problem only, not affecting any of the functional properties of the dispersion. Nonetheless, it has been the practice of the industry to eliminate the scum.

Red scum has been removed by skimming the dispersion with a vacuum tube. This can remove some but not all of the scum. In addition, it is very labor intensive. Preferably the scum has been eliminated by adding a chelating agent for the iron prior to the concentrating of the dispersion. Citric acid has been used as such an agent but will fail to prevent red scum (1) if added after the addition of ammonium hydroxide, (2) if the level of iron is too high for the amount of citric acid added or (3) if other chemicals present complex with citrate and compete with the iron. Alternatively, ethylenediamine tetra-acetic acid (EDTA) was found to be a better chelating agent than citric acid especially for dispersions of FEP which are much more prone to red scum than PTFE dispersions. Scum formation in FEP dispersion appears to be the result of the higher level of fluoride ion content in the FEP copolymer which is due to hydrolysis of the more numerous end groups. In FEP dispersions, the fluoride ion complexes with the chelating agent and thus competes with the iron. The use of EDTA as the chelating agent instead of citric acid results in stronger iron complexing as evidenced by the equilibrium constant for EDTA complex being $10^{26}$ as compared to $10^{11}$ for citric acid, thereby eliminating the competition presented by the fluoride ion. Such complexes are totally soluble in the dispersion.

As described In U.S. Pat. No. 2,559,752 to Berry, fluorosurfactants are used as non-telogenic dispersing agents in the formation of aqueous fluoropolymer dispersions. As has been further taught in U.S. Pat. No. 3,882,153 (Seki et al) and U.S. Pat. No. 4,282,162 (Kuhls), these expensive fluorosurfactants can be recovered either from the aqueous phase after the polymer has been coagulated from the dispersion or in the aqueous polymer dispersions prior to concentration. A preferred method of recovering the fluorosurfactant from the fluoropolymer dispersion as taught in both Kuhls and Seki et al. is by adsorption onto an ion exchange resin. Strongly basic anionic exchange resin in particular has been found useful for the nearly quantitative removal of the preferred fluorosurfactant, ammonium perfluorooctanoate (PFOA). Ion exchange resins in the hydroxide form are preferred. However, as the fluorosurfactant replaces the hydroxide ion at the ion exchange site and the pH of solution increases, red scum formation is observed for dispersions containing iron.

What is desired is a process to both reduce the amount of fluorosurfactant in the final dispersion product and reduce red scum formation in the preparation of aqueous fluoropolymer dispersions.

BRIEF SUMMARY OF THE INVENTION

The present invention is a process for both reducing the fluorosurfactant content of a stabilized fluorosurfactant-containing aqueous fluoropolymer dispersion containing ferric ions and reducing the formation of red scum. The process includes contacting the stabilized fluorosurfactant-containing aqueous fluoropolymer dispersion with strong base anion exchange resin to reduce fluorosurfactant content to a predetermined level wherein the anion exchange resin is in the hydroxide form, separating the dispersion from the anion exchange resin, and adding an effective amount of chelating agent having an equilibrium constant when complexed with iron of at least $10^{18}$ prior to the contacting with the anion exchange resin for complexing ferric ions to prevent scum formation i.e., the formation insoluble ferric hydroxide. The preferred chelating agent used in the process is ethylenediamine tetraacetic acid (EDTA) or salt thereof and the amount of EDTA or its salt added is preferably in the range of 2 to 100 ppm so as to minimize the competition of EDTA and fluorosurfactant for the ion exchange site, while removing the ferric ions and avoiding the formation of red scum. The process preferably reduces fluorosurfactant content to a predetermined level of no greater than about 300 ppm. more preferably a predetermined level no greater than about 100 ppm, and most preferably a predetermined level of no more than 50 ppm.

DETAILED DESCRIPTION OF THE INVENTION

As discussed above, prevention of red scum formation by the treatment of aqueous fluoropolymer dispersion with either citric acid or ethylenediamine tetraacetic acid (EDTA) prior to the addition of ammonia to raise the pH to at least about 9 to prevent bacterial growth is well known. The EDTA or citric acid acts as a chelating agent complexing with ferric ions in solution and preventing the formation of insoluble ferric hydroxide which floats to the top of the dispersion as visible red scum.

However, addition of a chelating agent just prior to addition of ammonia is not desirable when the dispersion has been treated with a strong base anion exchange resin in the hydroxide form in order to reduce fluorosurfactants. Processing the dispersion in this way can raise the pH sufficiently to cause scum formation even before ammonia is added.

According to the present invention, in order to both reduce fluorosurfactant content and prevent scum formation, the chelating agent should be added prior to contacting the stabilized dispersion with the strong base anion exchange resin in hydroxide form in order to complex ferric ions in solution. The chelating agent used in the present invention has an equilibrium constant when complexed with iron of at least $10^{18}$, i.e., forming a strong complex eliminating competition of the chelating agent with the fluorosurfactant for the ion exchange sites of the anion exchange resin. In this way, efficient fluorosurfactant reduction is not hindered. Preferred chelating agents include ethylenediamine tetraacetic acid (EDTA) or salts thereof including mono-, di-, tri- and tetra-salts of sodium and potassium. In one preferred embodiment, the disodium salt of ethylenediamine tetraacetic acid is preferred for dispersions which have application as coatings on surfaces which come in contact with food.

Further according to the process of this invention, the chelating agent is present in an effective amount that is sufficient to complex ferric ions in the dispersion but is not in substantial excess. Substantial excess amounts of chelating agent would interfere with efficient fluorosurfactant reduction by competing for the ion exchange sites of the anion exchange resin. Preferably, when the chelating agent is EDTA or a salt thereof, the chelating agent is added to added in the amount of about 2 to about 100 ppm to the dispersion, preferably about 2 to about 50 ppm.

As will be described more fully below, in accordance with invention, the contacting of the stabilized dispersion with anion exchange resin permits reducing the fluorosurfactant content of a fluorosurfactant-containing aqueous fluoropolymer dispersion to a predetermined level, preferably a level no greater than about 300 ppm, more preferably a predetermined level no greater than about 100 ppm, especially a predetermined level no greater than about 50 ppm.

Fluoropolymer

The stabilized fluorosurfactant-containing aqueous fluoropolymer dispersion for treatment in accordance with the present invention is made by dispersion polymerization (also known as emulsion polymerization). The aqueous fluoropolymer dispersions is a stabilized fluorosurfactant-containing aqueous fluoropolymer dispersion which means that it contains sufficient nonionic surfactant to prevent coagulation of the dispersion when the fluorosurfactant content is reduced. As will be explained in more detail hereinafter, depending upon when the process of the invention is employed, the nonionic surfactant may already be present or may be added for stabilization prior to treatment according to the invention. After concentration, aqueous fluoropolymer dispersions are useful as coating or impregnating compositions and to make cast films.

Fluoropolymer dispersions are comprised of particles of polymers made from monomers wherein at least one of the monomers contains fluorine. The fluoropolymer of the particles of the aqueous dispersions used in this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

The invention is especially useful when the fluoropolymer component of the dispersion is polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modified PTFE contains a small amount of comonomer modifier which improves film forming capability during baking (fusing), such as perfluoroolefin, notably hexafluoropropylene (HFP) or perfluoro (alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1 \times 10^9$ Pa·s. Such high melt viscosity indicates that the PTFE does not flow in the molten state and therefore is not melt-processible. PTFE and modified PTFE are frequently sold in dispersion form and transported in shipping containers and the process of the invention can be readily employed for reducing the fluorosurfactant content of such dispersions.

The fluoropolymer component of the dispersion may be melt-processible. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pass to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride(PVDF) and copolymers of vinylidene fluoride as well as polyvinyl fluoride (PVF) and copolymers of vinyl fluoride.

Fluorosurfactants

The fluorosurfactant in the fluorosurfactant-containing dispersions to be reduced in this process is a non-telogenic, ionizable dispersing agent, soluble in water and comprising an ionic hydrophilic group and a hydrophobic portion. Preferably, the hydrophobic portion is an aliphatic fluoroalkyl group containing at least four carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Ion Exchange Resin

For the practice of this invention, a strongly basic anion exchange resin in the hydroxide form is used to remove fluorosurfactant from fluoropolymer dispersion. Suitable strongly basic anion exchange resin comprises a polymer and functional groups of quaternary ammonium groups. Strong base ion exchange resins have the advantage of less sensitivity to the pH of the media. Ion exchange resins in the form of a hydroxyl counter ion are used in preference to ion exchange resin with a chloride counter ion thereby eliminating concern over chloride ion presence in the final dispersion product which could be detrimental to end-use processing equipment. The anion exchanger resin is brought into the OH- form preferably by contact with the NaOH solution. Examples of suitable commercially-available ion exchange resins in the form of the hydroxyl counter ion include: Dowex 550A, US Filter A464-OH, US Filter A244-OH, Sybron M-500-OH, Sybron ASB1-OH, Purolite A-500-OH, ltochu TSA 1200, Amberlite IR 402.

Anion exchange resin used in the process of the present invention is preferably monodisperse. More preferably, the anion exchange resin beads have a number average size distribution in which 95% of the beads have a diameter within plus or minus 100 µm of the number average bead diameter.

The monodisperse anion exchange resin has a particle size which provides a suitable pressure drop through the bed. Very large beads are fragile and prone to breakage. Very small anion exchange beads are susceptible to tight particle packing resulting in tortuous channels in the bed. This can result in high shear conditions in the bed. Preferred anion exchange resin has a number average bead size about 450 to about 800 µm, more preferably, the anion exchange resin beads have a number average bead diameter of about 550 to about 700 µm.

Non-Ionic Surfactants

Aromatic alcohol ethoxylates can be used as the nonionic surfactant for stabilization of fluorosurfactant-containing aqueous fluoropolymer dispersion prior to ion exchange treatment and also for the concentration of such dispersions according to the teachings of Marks et al., U.S. Pat. No. 3,037,953, and in Holmes, U.S. Pat. No. 3,704,272. However, due to some concern about possible environmental effect of aromatic compounds, preferred nonionic surfactants are aliphatic alcohol ethoxylates. Suitable nonionic surfactants include any of a variety of aliphatic alcohol ethoxylates or mixtures thereof which provide the desired cloud point during concentration and which provide desired properties in the dispersion, e.g., low burn off temperature, dispersion stability, etc. Many of these nonionic surfactant compositions are disclosed in Marks et al., U.S. Pat. No. 3,037,953 and Miura et al., U.S. Pat. No. 6,153,688. Especially preferred nonionic surfactants are a compound or mixture of compounds of the formula:

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18 as disclosed in Cavanaugh EP 1472307 A1.

Process

A typical process for the aqueous dispersion polymerization of preferred polymer PTFE is a process wherein TFE vapor is fed to a heated reactor containing fluorosurfactants, paraffin wax and deionized water. A chain tranfer agent may also be added if it is desired to reduce the molecular weight of the PTFE. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and the dispersion is isolated and stabilized with nonionic surfactant. Fluoropolymer dispersion so processed will contain some amount of ferric ions either from the metal equipment used in polymerization and processing or from the addition of iron compounds such as catalysts etc. or due to their presence in the water itself.

According to the process of this invention, an effective amount of suitable chelating agent as described above is added to stabilized fluorosurfactant-containing aqueous fluoropolymer dispersion prior to contacting the fluorosurfactant-containing aqueous fluoropolymer dispersion with anion exchange resin in the hydroxide form. In this way, a strongly bonded iron complex is formed. Scum formation is prevented and the fluorosurfactant is removed by being strongly absorbed on the ion exchanger resin. The stabilized dispersion typically contains 1-5% nonionic exchange resin.

Any of a variety of techniques which bring the dispersion in contact with the anion exchange resin can be used for carrying out the ion exchange process. For example, the process can be carried out by addition of ion exchange resin bead to the dispersion in a stirred tank, in which a slurry of the dispersion and resin is formed, followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by a mixture of dilute mineral acid with organic solvent (e.g., HCl/ethanol) as demonstrated by Kuhis in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, or other forms of concentration etc.

After ion exchange treatment, the aqueous fluoropolymer dispersion with reduced fluorosurfactant content and complexed ferric ions is transferred to a dispersion concentration operation. Prior to dispersion concentration, the pH of the dispersion is typically increased above 9 by the addition of a base such as an aqueous ammonia or sodium hydroxide solution in order to prevent bacterial growth in the dispersion. Because of the effective addition of chelating agent above, scum formation is prevented. In the dispersion concentration operation, the dispersion is concentrated with the aid of a nonionic surfactant as taught in Marks et al., U.S. Pat. No. 3,037,953, and in Holmes, U.S. Pat. No. 3,704,272 to raise the solids from nominally 35 wt % to about 60 wt %. Miura et al., U.S. Pat. No. 6,153,688 discloses a similar process. The nonionic surfactant selected is typically the surfactant selected for stabilization when the dispersion is isolated (after wax removal) for ion exchange treatment.

As described herein, the contacting of the stabilized dispersion with anion exchange resin has been carried out before concentration. This may be advantageous because of the low solids dispersion has lower viscosity and processing is facilitated. The process of this invention may be carried out on stabilized dispersion which have been concentrated provided that the chelating agent is again added prior to contacting the dispersion with anion exchange resin in the hydroxide form.

The dispersion polymerization of melt-processible TFE copolymers is similar except that one or more comonomers are added to the batch initially and/or introduced during polymerization. In addition, a telogen such as a hydrocarbon is employed to control the molecular weight to achieve the desired melt flow of the polymer for the intended purpose. The same dispersion concentration operation used for PTFE dispersions can be used for TFE copolymer dispersions.

What is claimed is:

1. A process for reducing fluorosurfactant content of a stabilized fluorosurfactant-containing aqueous fluoropolymer dispersion containing ferric ions comprising:

contacting said fluorosurfactant-containing aqueous fluoropolymer dispersion with strong base anion exchange resin to reduce fluorosurfactant content to a predetermined level, said anion exchange resin being in the hydroxide form, separating said anion exchange resin from said dispersion after the fluorosurfactant content has been reduced; and adding an effective amount of chelating agent having an equilibrium constant of at least $10^{18}$ when said chelating agent is complexed with iron prior to said contacting with said anion exchange resin for complexing ferric ions to prevent scum formation.

2. The process of claim 1 wherein said chelating agent is ethyl enediamine tetraacetic acid or salt thereof.

3. The process of claim 2 wherein said ethylenediamine tetraacetic acid or salt is added to said dispersion in an amount of about 2 to about 100 ppm.

4. The process of claim 1 wherein said effective amount of chelating agents is sufficient to complex ferric ions in said dispersion but is not in substantial excess causing competition with fluorosurfactant for ion exchange cites of said anion exchange resin.

5. The process of claim 1 wherein said anion exchange resin comprises a polymer having functional groups comprising quaternary ammonium groups.

6. The process of claim 1 wherein said contacting said fluorosurfactant-containing aqueous fluoropolymer dispersion with anion exchange resin reduces fluorosurfactant content to no greater than 300 ppm.

7. The process of claim 1 wherein said contacting said fluorosurfactant-containing aqueous fluoropolymer dispersion with anion exchange resin reduces fluorosurfactant content to no greater than 100 ppm.

8. The process of claim 1 wherein said contacting said fluorosurfactant-containing aqueous fluoropolymer dispersion with anion exchange resin reduces fluorosurfactant content to no greater than 50 ppm.

* * * * *

UNITED STATES PATENT AND TRADEMARK OFFICE
CERTIFICATE OF CORRECTION

PATENT NO. : 7,619,018 B2  Page 1 of 1
APPLICATION NO. : 11/292455
DATED : November 17, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this

Twenty-sixth Day of October, 2010

David J. Kappos
*Director of the United States Patent and Trademark Office*